(12) United States Patent
Whiton et al.

(10) Patent No.: US 11,890,850 B2
(45) Date of Patent: Feb. 6, 2024

(54) ADDITIVE MANUFACTURING OF HIGHLY FLEXIBLE ELECTROPHORETIC FILM AND TEXTILE COMPOSITES

(71) Applicant: Flex Ltd., Singapore (SG)

(72) Inventors: Adam M. Whiton, Chestnut Hill, MA (US); Mark A. Bergman, Hollister, CA (US); Eva W. Maskalenko, Somerville, MA (US); Anthony Joseph Piazza, San Jose, CA (US)

(73) Assignee: Flex Ltd., Singapore (SG)

( * ) Notice: Subject to any disclaimer, the term of this patent is extended or adjusted under 35 U.S.C. 154(b) by 412 days.

(21) Appl. No.: 17/038,933

(22) Filed: Sep. 30, 2020

(65) Prior Publication Data

US 2021/0094270 A1  Apr. 1, 2021

Related U.S. Application Data

(60) Provisional application No. 62/908,074, filed on Sep. 30, 2019.

(51) Int. Cl.
*B32B 38/00* (2006.01)
*B33Y 70/00* (2020.01)
(Continued)

(52) U.S. Cl.
CPC .............. *B32B 38/145* (2013.01); *B32B 3/30* (2013.01); *B32B 27/12* (2013.01); *B32B 27/40* (2013.01); *B32B 38/1808* (2013.01); *B33Y 70/00* (2014.12); *B33Y 80/00* (2014.12); *C25D 13/12* (2013.01); *C25D 17/10* (2013.01);
(Continued)

(58) Field of Classification Search
None
See application file for complete search history.

(56) References Cited

U.S. PATENT DOCUMENTS

2010/0007942 A1   1/2010  Oikawa et al.
2011/0096388 A1*  4/2011  Agrawal ................. G02F 1/163
                                              29/846
(Continued)

FOREIGN PATENT DOCUMENTS

EP        1752820        2/2007

OTHER PUBLICATIONS

International Preliminary Report on Patentability for International (PCT) Patent Application No. PCT/IB2020/000816, dated Apr. 14, 2022 8 pages.

(Continued)

*Primary Examiner* — Jeffrey D Washville
(74) *Attorney, Agent, or Firm* — Sheridan Ross P.C.

(57) ABSTRACT

Embodiments of the disclosure provide a flexible and stretchable textile composite including an electrophoretic film. According to one embodiment, a textile composite material can comprise a textile base layer, a first flexible, optically transparent film layer deposited onto and affixed to the textile base layer, and an electrophoretic film layer disposed onto the first flexible, optically transparent film layer on a side of the first flexible, optically transparent film layer opposite the textile base layer. The electrophoretic film layer can comprise a plurality of relief cuts therein. The plurality of relief cuts can allow the electrophoretic film layer to flex or stretch in at least one direction.

6 Claims, 10 Drawing Sheets

(51) Int. Cl.
*B33Y 80/00* (2015.01)
*B32B 3/30* (2006.01)
*B32B 27/12* (2006.01)
*B32B 27/40* (2006.01)
*B32B 38/18* (2006.01)
*C25D 13/12* (2006.01)
*C25D 17/10* (2006.01)
*G02F 1/167* (2019.01)
*G02F 1/16755* (2019.01)

(52) U.S. Cl.
CPC .......... *G02F 1/167* (2013.01); *G02F 1/16755* (2019.01); *B32B 2307/20* (2013.01); *B32B 2307/4023* (2013.01); *B32B 2307/412* (2013.01); *B32B 2307/546* (2013.01); *B32B 2605/003* (2013.01)

(56) References Cited

U.S. PATENT DOCUMENTS

| | | | |
|---|---|---|---|
| 2012/0106095 A1* | 5/2012 | Daniel | H05K 1/0283 361/728 |
| 2017/0052422 A1 | 2/2017 | Kazlas et al. | |

OTHER PUBLICATIONS

International Search Report and Written Opinion for International (PCT) Patent Application No. PCT/IB2020/000816, dated Jan. 20, 2021 10 pages.

* cited by examiner

US 11,890,850 B2

ADDITIVE MANUFACTURING OF HIGHLY FLEXIBLE ELECTROPHORETIC FILM AND TEXTILE COMPOSITES

CROSS REFERENCE TO RELATED APPLICATION

The present application claims the benefits of and priority, under 35 U.S.C. § 119(e), to U.S. Provisional Application No. 62/908,074 filed Sep. 30, 2019 by Piazza et al and entitled "Additive Manufacturing of Highly Flexible Electrophoretic Film and Textile Composites" of which the entire disclosure is incorporated herein by reference for all purposes.

FIELD OF THE DISCLOSURE

Embodiments of the present disclosure relate generally to textile composites and more particularly to a flexible and stretchable textile composite including an electrophoretic film.

BACKGROUND

Indium tin oxide (ITO) is an optoelectronic material that is applied widely in various applications. For example, ITO is commonly used for products such as flat-panel displays, smart windows and doors, polymer-based electronics, thin film photovoltaics, and others. However, ITOs and the subsequent stack up of materials that supports the ITO are rigid and, while they may be able to flex or bend slightly, the bending radius of the material is very limited and they cannot be stretched at all. This rigidity limits the application of ITOs to flat or nearly flat surfaces and makes them unusable for application to surfaces that are curved or that include bends. Hence, there is a need for flexible and stretchable color changing, i.e., electrophoretic, films.

BRIEF SUMMARY

Embodiments of the disclosure provide a flexible and stretchable textile composite including an electrophoretic film. According to one embodiment, a textile composite material can comprise a textile base layer, a first flexible, optically transparent film layer deposited onto and affixed to the textile base layer, and an electrophoretic film layer disposed onto the first flexible, optically transparent film layer on a side of the first flexible, optically transparent film layer opposite the textile base layer. The electrophoretic film layer can comprise a plurality of relief cuts therein. The plurality of relief cuts can allow the electrophoretic film layer to flex or stretch in at least one direction. The electrophoretic film layer can comprise an electronic ink disposed between transparent Indium Tin Oxide (ITO) electrodes.

The textile composite material can further comprise a second flexible, optically transparent film layer deposited onto the electrophoretic film layer on a side of the electrophoretic film layer opposite the first flexible, optically transparent film layer. The first flexible, optically transparent film layer and the second flexible, optically transparent film layer can encapsulate the electrophoretic film layer.

The textile composite material can further comprise a semi-transparent, colored ink layer can be printed onto the second flexible, optically transparent film layer on a side of the second flexible, optically transparent film layer opposite the electrophoretic film layer and a polyurethane layer deposited on and affixed to at least an edge of the first flexible, optically transparent film layer, the electrophoretic film layer, and the second flexible, optically transparent film layer. The textile base layer extends beyond the polyurethane layer. In some cases, the polyurethane layer can extend across a surface of the semi-transparent, colored ink layer printed on the second flexible, optically transparent film layer.

The textile composite material can further comprise one or more clear ink layers printed onto the polyurethane layer on a side of the polyurethane layer opposite the semi-transparent, colored ink layer printed on the second flexible, optically transparent film layer. The one or more clear ink layers can provide a texture appearance or feel to the textile composite material.

According to another embodiment, an article of manufacture can comprise a covering on at least a portion of a surface of the article of manufacture. The covering can comprise a textile base layer, a first flexible, optically transparent laminated film layer deposited onto and affixed to the textile base layer, and an electrophoretic film layer disposed onto the first flexible, optically transparent film layer on a side of the first flexible, optically transparent film layer opposite the textile base layer. The electrophoretic film layer can comprise an electronic ink disposed between transparent ITO electrodes and can further comprise a plurality of relief cuts therein. The plurality of relief cuts can allow the electrophoretic film layer to flex or stretch in at least one direction.

The covering can further comprise a second flexible, optically transparent film layer deposited onto the electrophoretic film layer on a side of the electrophoretic film layer opposite the first flexible, optically transparent film layer. The first flexible, optically transparent film layer and the second flexible, optically transparent film layer can encapsulate the electrophoretic film layer. The covering can further comprise a semi-transparent, colored ink layer printed onto the second flexible, optically transparent film layer on a side of the second flexible, optically transparent film layer opposite the electrophoretic film layer, a polyurethane layer deposited on and affixed to a surface of the semi-transparent, colored ink layer printed on the second flexible, optically transparent film layer, and one or more clear ink layers printed onto the polyurethane layer on a side of the polyurethane layer opposite the semi-transparent, colored ink layer printed on the second flexible, optically transparent film layer. The one or more clear ink layers can provide a texture appearance or feel to the textile composite material.

In some cases, the article of manufacture can comprise a seat of a passenger vehicle and the covering comprises upholstery on the seat. In other cases, the article of manufacture can additionally, or alternatively, comprise a steering wheel of a passenger vehicle and the covering comprises a cover on the steering wheel. Additionally, or alternatively, the article of manufacture can comprise a dashboard of a passenger vehicle and the covering comprises upholstery on the dashboard. In yet other cases, the article of manufacture can additionally, or alternatively, comprise a control panel of a passenger vehicle and/or a control button of a passenger vehicle.

According to yet another embodiment, a method for producing a textile composite material can comprise depositing a first flexible, optically transparent film layer onto a textile base layer and disposing an electrophoretic film layer onto the first flexible, optically transparent film layer on a side of the first flexible, optically transparent film layer opposite the textile base layer. The electrophoretic film layer can comprises an electronic ink disposed between transparent Indium Tin Oxide (ITO) electrodes with a plurality of relief cuts therein. The plurality of relief cuts can allow the electrophoretic film layer to flex or stretch in at least one direction. The electrophoretic film layer can be printed with an electronic ink.

A second flexible, optically transparent film layer can be deposited onto the electrophoretic film layer on a side opposite of the electrophoretic film layer opposite the first flexible, optically transparent film layer. The first flexible, optically transparent film layer and the second flexible, optically transparent film layer can encapsulate the electrophoretic film layer.

A semi-transparent, colored ink layer can be printed onto the second flexible, optically transparent film layer on a side of the second flexible, optically transparent film layer opposite the electrophoretic film layer and a polyurethane layer can be deposited onto at least an edge of the first flexible, optically transparent film layer, the electrophoretic film layer, and the second flexible, optically transparent film layer. The textile base layer can extend beyond the polyurethane layer. In some cases, the polyurethane layer can be deposited across a surface of the semi-transparent, colored ink layer printed on the second flexible, optically transparent film layer.

One or more clear ink layers can be printed onto the polyurethane layer on a side of the polyurethane layer opposite the semi-transparent, colored ink layer printed on the second flexible, optically transparent film layer. The one or more clear ink layers can provide a texture appearance and/or feel to the textile composite material.

Figure 1A:
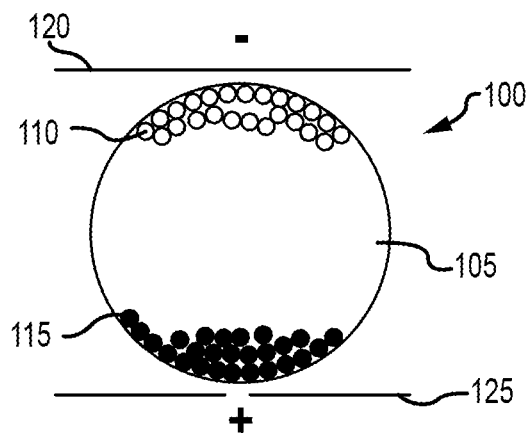
FIGS. 1A-1C are diagrams illustrating a cross-sectional view of electronic ink microcapsules of an electrophoretic film that can be used in various embodiments of the present disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Embodiments of the disclosure provide a flexible and stretchable textile composite including an electrophoretic film. In accordance with at least one embodiment of the present disclosure, a composite material consisting of a semi-rigid electrically active film, specifically an electrophoretic film (color changing), can be made highly flexible and stretchable through a combination of patterned relief cuts with a deposited polymer (polyurethane) mesh structure bonded onto textiles. The geometry of the relief cuts allow for control of the bend in the x and y coordinates as well as the z coordinate with the film twisting slightly. This allows the composite to attain some stretch. Such composites can increase flexibility/bend radius of the semi-rigid electrophoretic film creating a multi-axis, multi-plane bending composite.

Figure 1B:
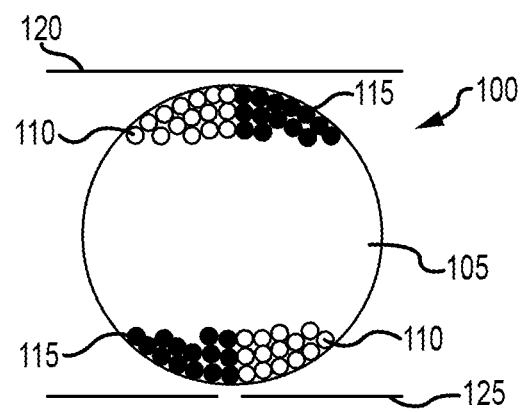
Figure 1C:
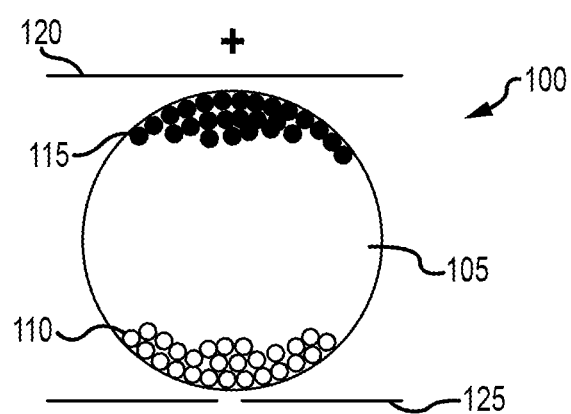

FIGS. 1A-1C are diagrams illustrating a cross-sectional view of electronic ink microcapsules of an electrophoretic film that can be used in various embodiments of the present disclosure. As illustrated in the example of FIG. 1A and as known in the art, an electrophoretic film 100 can comprise a number of electronic ink microcapsules 105. Each electronic microcapsule 105 can contain therein pigment chips 110 and 115 of different colors. Each electronic microcapsule 105 can be disposed between a pair of transparent electrodes 120 and 125. The electrodes can comprise sheets of Indium Tin Oxide (ITO). As illustrated in FIGS. 1A, 1B, and 1C respectively, as a different polarity charge is applied to the electrodes 120 and 125, the pigment chips 110 and 115 can change position within the microcapsule 105 thereby changing the color appearance of the microcapsule 105 and the electrophoretic film 100 overall.

However, the ITO material stack is stiff, relatively inflexible, and cannot be stretched. According to one embodiment, a textile composite can incorporate an electrophoretic film 100 that is both flexible and stretchable. As will be described in detail below, the electrophoretic film 100 according to embodiments described herein can comprise relief cuts in one or more of a variety of different patterns. These relief cuts can be made in the electrophoretic film 100 to allow the electrophoretic film 100 to bend and/or stretch in one or more dimensions as mentioned above.

Figure 2:
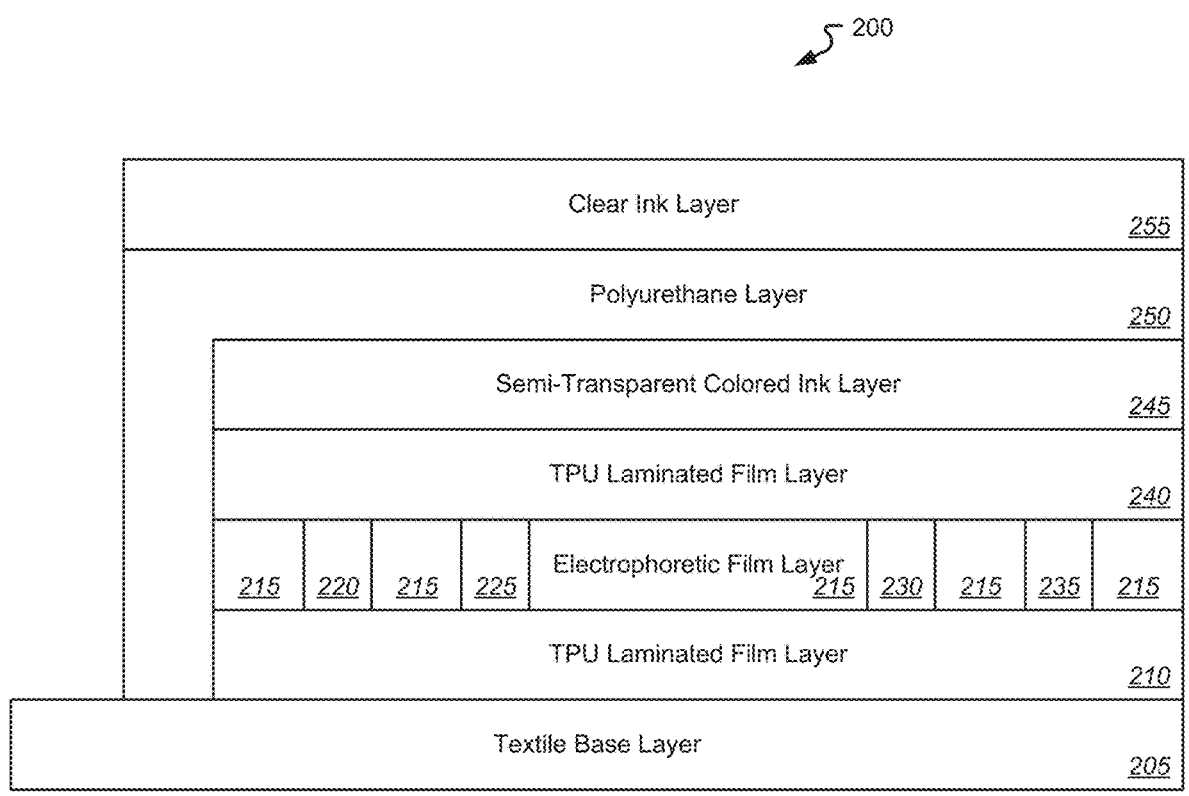
FIG. 2 is a block diagram illustrating a cross-sectional view of a flexible and stretchable textile composite including an electrophoretic film according to one embodiment of the present disclosure.

FIG. 2 is a block diagram illustrating a cross-sectional view of a flexible and stretchable textile composite including an electrophoretic film according to one embodiment of the present disclosure. As illustrated in this example, a textile composite material 200 can comprise a textile base layer 205. The textile base layer 205 can comprise any of a wide variety of textile fabrics including, but not limited to, woven, non-woven, and knot fabrics, of any of a wide variety of materials including, but not limited to, cotton, polyester, nylon, etc.

The textile composite material 200 can further comprise a first flexible, optically transparent film layer 210 deposited onto and affixed to the textile base layer 205. For example, and as shown here, the first flexible, optically transparent film layer can comprises a Thermoplastic PolyUrethane (TPU) laminated film. While reference is made here and elsewhere in this description to a TPU laminated film layer, it should be understood that any similar flexible, optically transparent layer can be used in various other embodiments of the present disclosure and such embodiments are considered to be within the scope of the present description. As known in the art, TPU is a soft, flexible thermoplastic. The first TPU laminated film layer 210 can be deposited onto the textile base layer 205 using a variety of commonly available techniques known in the art.

The textile composite material 200 can further comprise an electrophoretic film layer 215 disposed onto the first TPU laminated film layer 210 on a side of the first TPU laminated film layer 210 opposite the textile base layer 205. The electrophoretic film layer 215 can comprise an electronic ink disposed between transparent electrodes of ITO, for example, such as described above and as known in the art. According to one embodiment, the electrophoretic film layer 215 can comprise a plurality of relief cuts 220, 225, 230, and 235 or holes therein. The geometry of the relief cuts allow for control of the bend in the x and y coordinates as well as the z coordinate with the film twisting slightly. This allows the composite to attain some stretch. Therefore, the plurality of relief cuts 220, 225, 230, and 235 can allow the electrophoretic film layer to flex or stretch in at least one direction. The sizes, shapes, locations, and patterns of the relief cuts 220, 225, 230, and 235 can vary depending upon the implementation and the flexibility and/or stretchability desired for the use of the textile composite 200. Examples of various possible relief cut patterns will be described below with reference to FIGS. 3A-3I.

The textile composite material 200 can further comprise a second flexible, optically transparent film layer 240 deposited onto the electrophoretic film layer 215 on a side of the electrophoretic film layer 215 opposite the first TPU laminated film layer 210. Again, while reference is made here and elsewhere in this description to a TPU laminated film layer, it should be understood that any similar flexible, optically transparent layer can be used in various other embodiments of the present disclosure and such embodiments are considered to be within the scope of the present description. The first TPU laminated film layer 210 and the second TPU laminated film layer 240 can encapsulate the electrophoretic film layer 215 thereby helping to seal the edges of the electrophoretic film that have been relief cut from water ingress. It should also be noted that either of both of the TPU laminated film layers 210 and 215 should be considered optional.

The textile composite material 200 can further comprise a semi-transparent, colored ink layer 245 printed onto the second TPU laminated film layer 240 on a side of the second TPU laminated film layer 240 opposite the electrophoretic film layer 215. The semi-transparent, colored ink layer 245 can comprise a color selected to enhance and/or change one or more colors of the underlying electrophoretic film layer 215.

The textile composite material 200 can further comprise a polyurethane layer 250 deposited on and affixed to at least an edge of the first TPU laminated film layer 210, the electrophoretic film layer 215, the second TPU laminated film layer 245, and the semi-transparent, colored ink layer 245. The textile base layer 205 can extend beyond the polyurethane layer 250 to facilitate sewing of the textile composite 200. In some cases, the polyurethane layer 250 can be deposited across some or all of the surface of the semi-transparent, colored ink layer 245 thereby forming a solid, partial, or mesh covering over the semi-transparent colored ink layer 245. Depositing the polyurethane layer 250 can be accomplished by techniques as known in the art.

The textile composite material 200 can further comprise one or more clear ink layers 255 printed onto the polyurethane layer 250 on a side of the polyurethane layer 250 opposite the semi-transparent, colored ink layer 245 printed on the second TPU laminated film layer 240. The one or more clear ink layers 255 can provide a texture appearance or feel to the textile composite material. For example, the gloss or sheen of the one or more clear ink layers 255 and/or variations therein, the textile composite can be made to resemble various other materials such as wood grain, leather, metal, etc. Similarly, multiple one or more clear ink layers are printed/deposited on top of each other to increase depth/height of the texture. Through such patterns of variations in the thickness of the one or more clear ink layers 255 applied during printing 830, the textile composite can be given a tactile feel resembling other materials.

Production processes for the textile composite material 200 can vary stretchability and/or flexibility through varied thickness, geometry and durometer of the polymer of the polymer layers 210 and 240 and/or the polyurethane layer 250. Optical tuning of the underlaying electrophoretic film layer 215 can be accomplished with clear, semi-opaque, textured patterned surface treatments in the semi-transparent, colored ink layer 245 and/or one or more clear ink layers 255. Frequency tuning and lens curvatures can be accomplished through the polymer layers 210 and 240 and/or the polyurethane layer 250. The appearance, e.g., hue, saturation, etc., of the color changing electrophoretic film layer 240 can be altered through applied color patterns in the semi-transparent, colored ink layer 245 and/or one or more clear ink layers 255, e.g., by mixing primary colors with underlaying color of the electrophoretic film layer 240 to create secondary colors.

Figure 3A:
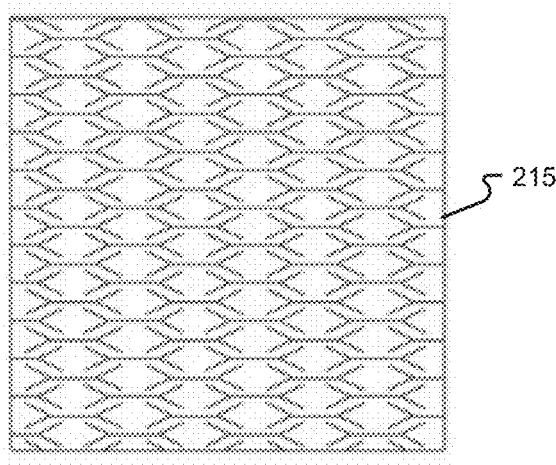
FIGS. 3A-3I are diagrams illustrating a variety of relief cut patterns that may be made in an electrophoretic film layer of a flexible and stretchable textile composite according to various embodiments of the present disclosure.
Figure 3B:
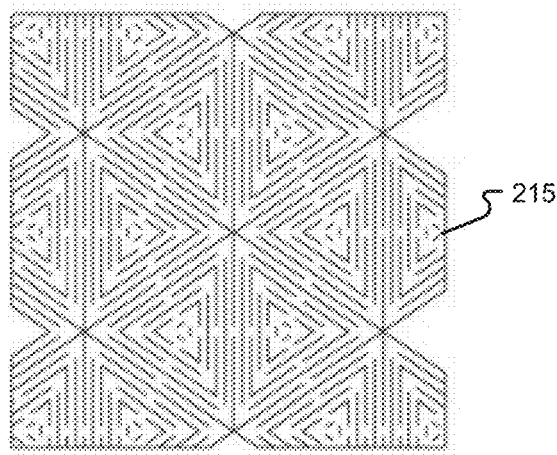
Figure 3C:
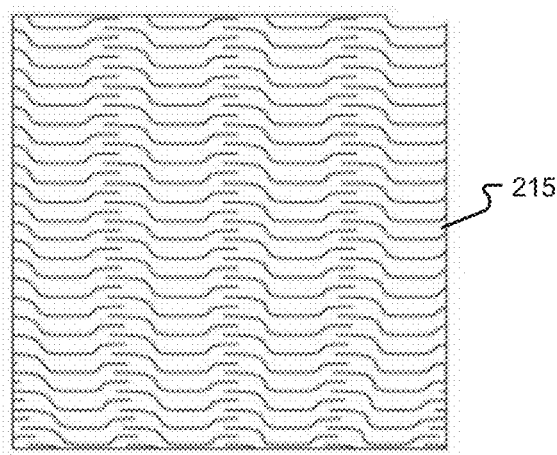
Figure 3D:
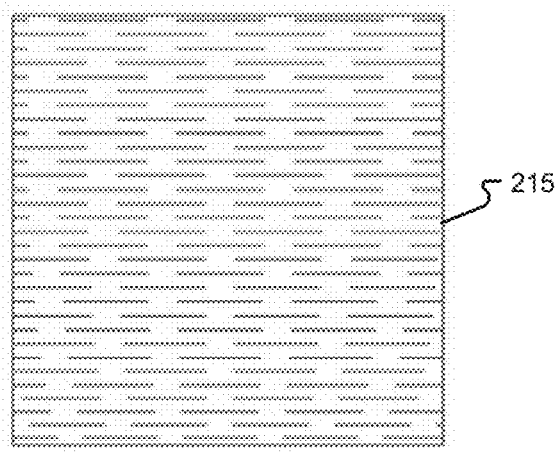
Figure 3E:
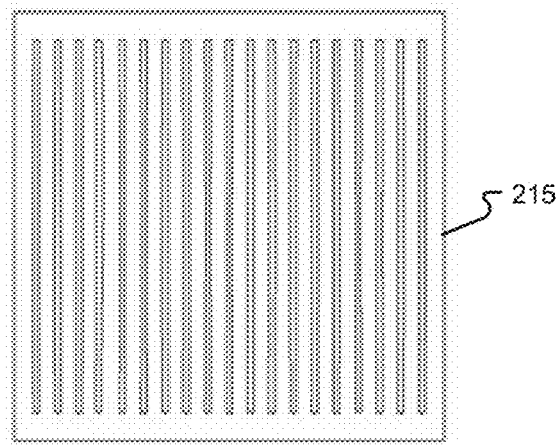
Figure 3F:
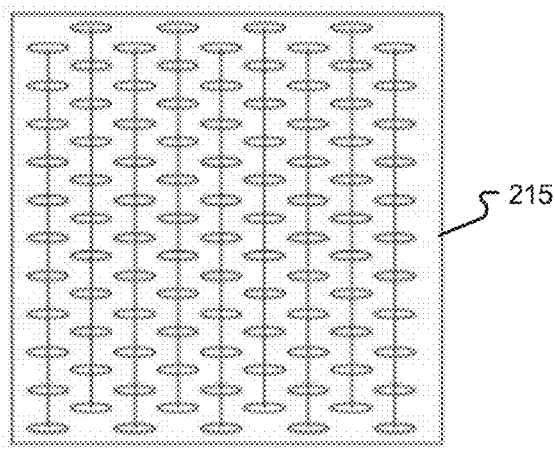
Figure 3G:
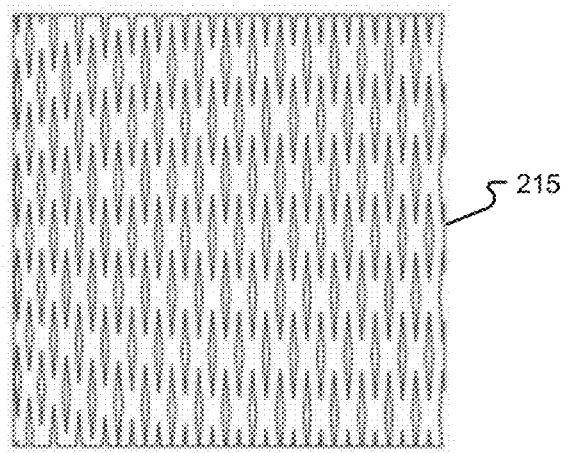
Figure 3H:
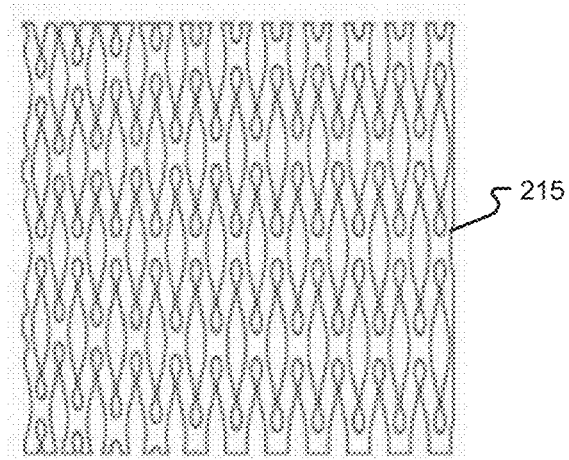
Figure 3I:
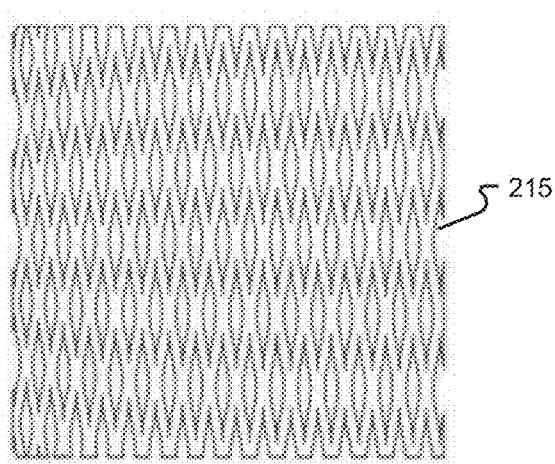

FIGS. 3A-3I are diagrams illustrating a variety of relief cut patterns that may be made in an electrophoretic film layer of a flexible and stretchable textile composite according to various embodiments of the present disclosure. As noted above, the electrophoretic film layer 215 can comprise an electronic ink disposed between transparent electrodes of ITO. According to one embodiment, to allow the electrophoretic film layer 215 to bend and/or stretch, patterns of relief cuts can be made in the film 215. These patterns can vary significantly depending upon the flexibility and/or stretchability desired for a particular application. For example, patterns such as illustrated in FIGS. 3A, 3B, 3C, and 3D may allow the electrophoretic film layer 215 to bend in one or more directions but may provide for limited stretching while patterns such as illustrated in FIGS. 3E and 3F may provide some ability to stretch as well as bend. Other patterns, such as illustrated in FIGS. 3G, 3H, and 3I may provide greater stretchability. It should be understood that the relief cut patterns illustrated here are provided as examples only and are not intended to limit the scope of the present disclosure. It should be further understood that additional and/or different patterns are contemplated and are considered to be within the scope of the present disclosure.

Figure 4:
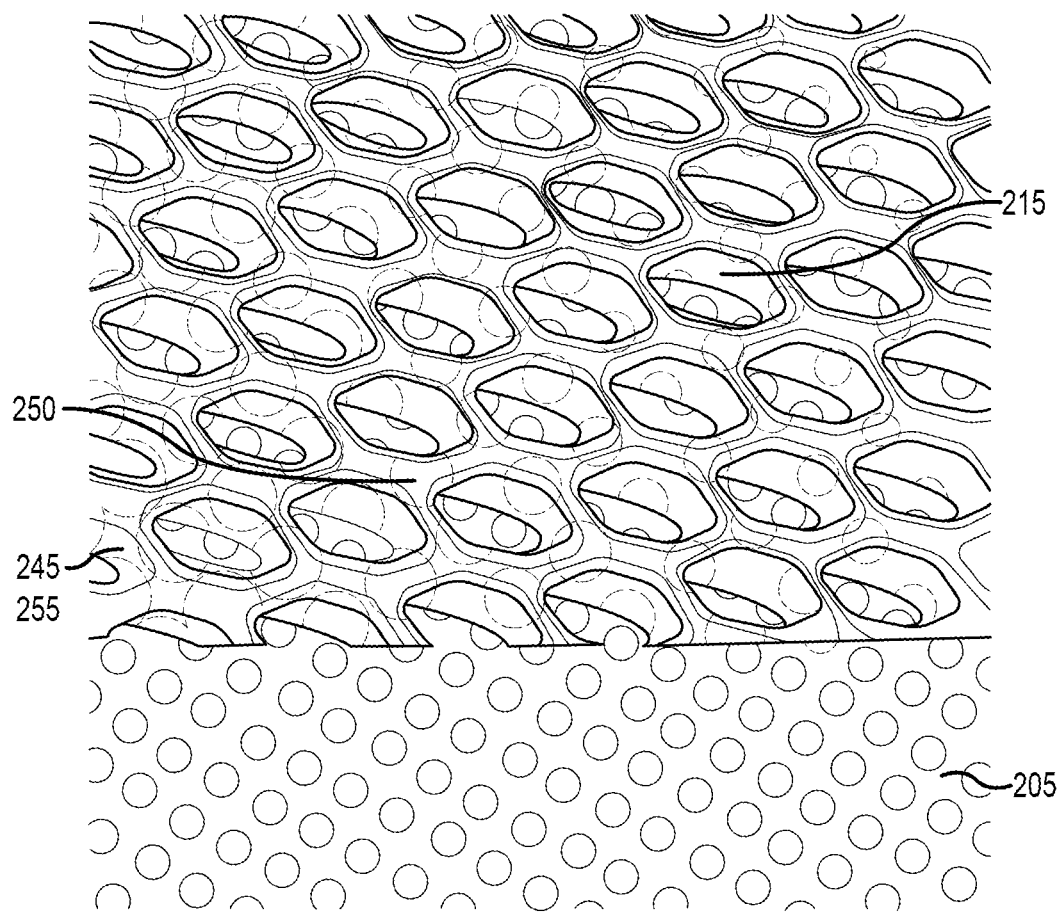
FIG. 4 is a diagram illustrating a view of a flexible and stretchable textile composite including an electrophoretic film according to one embodiment of the present disclosure.

FIG. 4 is a diagram illustrating a view of a flexible and stretchable textile composite including an electrophoretic film according to one embodiment of the present disclosure. More specifically, this example illustrates the textile base layer 205 which can comprise, for example, a neoprene mesh. The electrophoretic film layer can be seen disposed over the textile base layer 205. Both the semi-transparent, colored ink layer 245 and one or more clear ink layers 255 as well as the polyurethane layer can be seen over the electrophoretic film layer 215.

Figure 5:
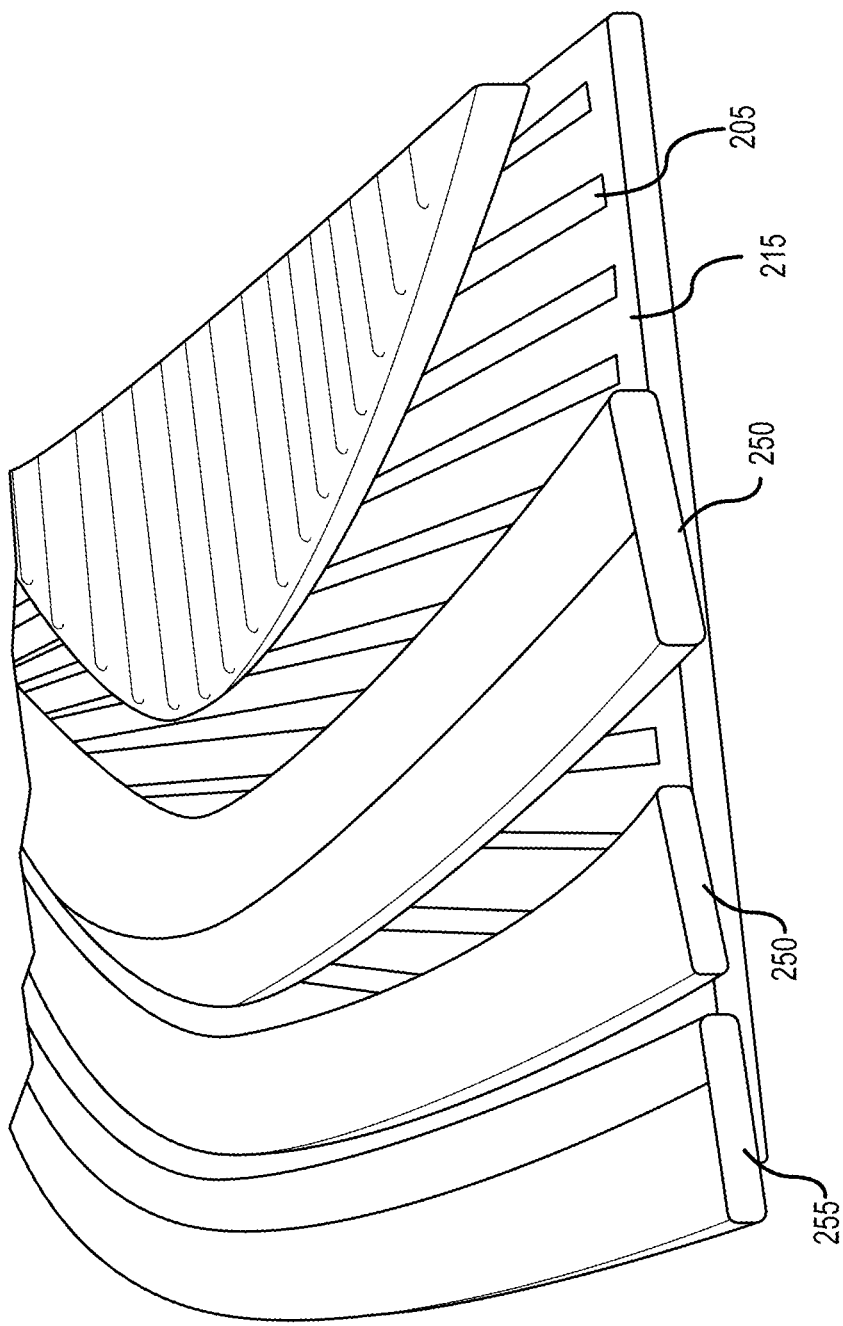
FIG. 5 is a diagram illustrating an edge of a flexible and stretchable textile composite including an electrophoretic film according to one embodiment of the present disclosure.

FIG. 5 is a diagram illustrating an edge of a flexible and stretchable textile composite including an electrophoretic film according to one embodiment of the present disclosure. More specifically, this example illustrates the textile base layer 205 and electrophoretic film layer 215, encapsulated in the first and second TPU laminated film layers 210 and 240 as described above. The polyurethane layer 250 is shown here as a set of strengthening and protective ridges 250 as well as a protective and transitional edge 255. As with other examples provided herein, it should be understood that this example is provided for illustrative purposes only and is not intended to limit the scope of the present disclosure. Rather, the location, size, shape, and coverage of the polyurethane layer 250 can vary significantly without departing from the scope of the present disclosure and any such variations are contemplated and considered to be within the scope of the present disclosure.

Figure 6:
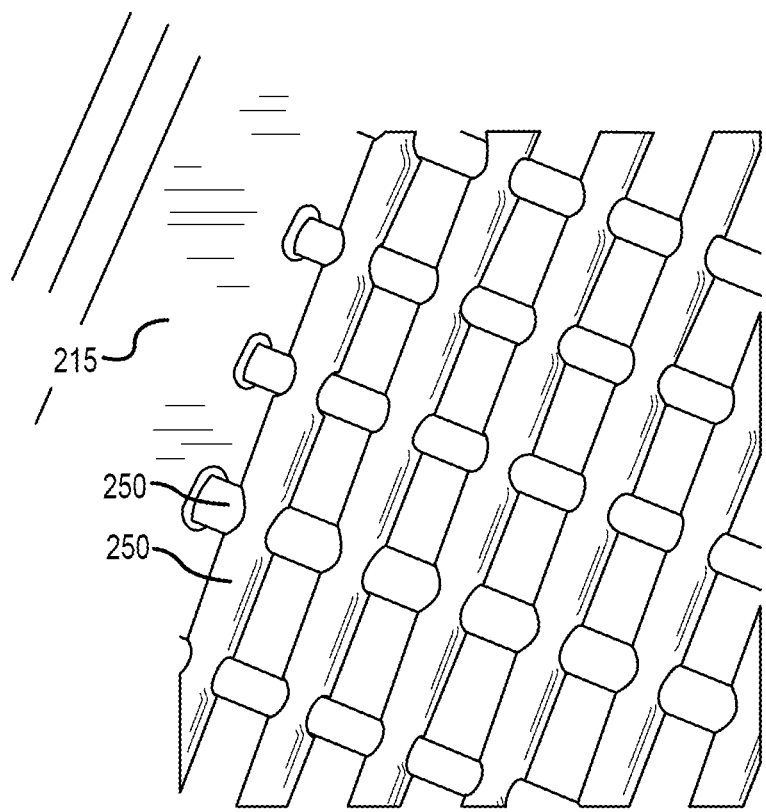
FIG. 6 is a diagram illustrating a polyurethane deposited mesh pattern on an electrophoretic film according to one embodiment of the present disclosure.

FIG. 6 is a diagram illustrating a polyurethane deposited mesh pattern on an electrophoretic film according to one embodiment of the present disclosure. In some cases, the polyurethane layer 250 can comprise a mesh pattern over some or all of the electrophoretic film layer 215. For example, in applications such as clothing or wearable devices, breathability of the textile composite can be improved by using such a mesh pattern in the polyurethane layer 250.

Figure 7:
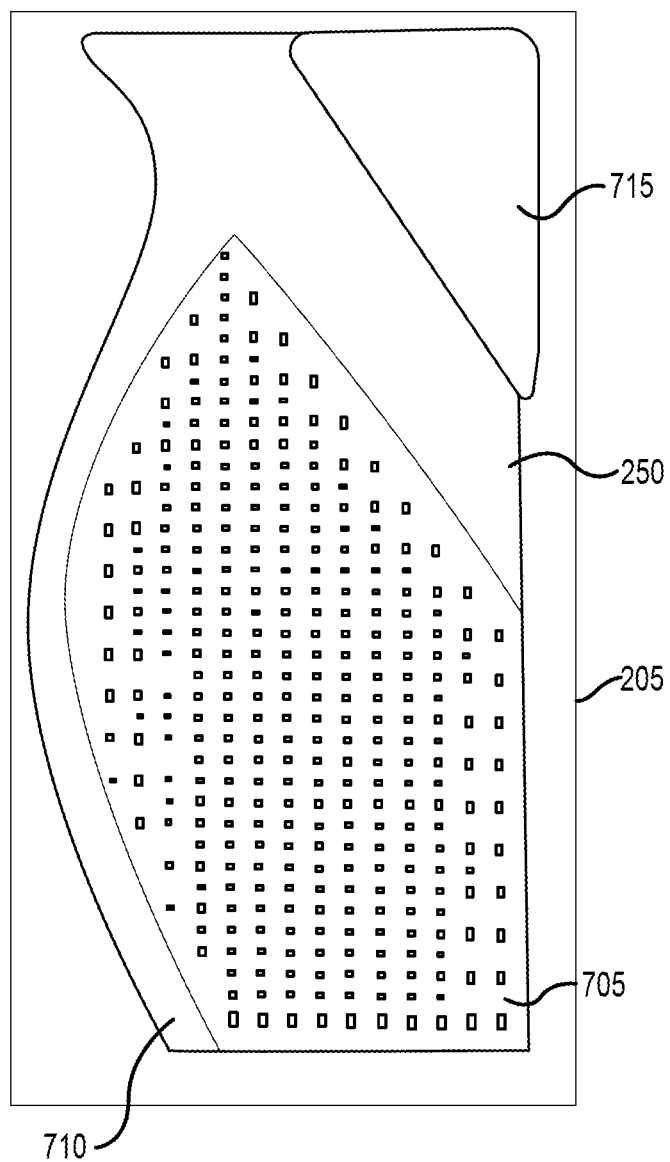
FIG. 7 is a diagram illustrating a portion of a flexible and stretchable textile composite including an electrophoretic film according to one embodiment of the present disclosure.

FIG. 7 is a diagram illustrating a portion of a flexible and stretchable textile composite including an electrophoretic film according to one embodiment of the present disclosure. As seen in this example, and as described above, the textile base layer 205 can extend beyond the polyurethane layer 250. The polyurethane layer 250, in this example, can comprise a mesh portion 705 extending across the electrophoretic film layer (not shown here) as also described above. A protective and transitional edge 710 can also be formed in the polyurethane layer 250 as well as a thicker portion 715 in areas where reinforcement may be useful. For example, such a reinforced, thicker portion 715 may be useful to provide rigidity and reinforcement in an area where electrical interconnection may be made to the electrophoretic film layer. As with other examples provided herein, it should be understood that this example is provided for illustrative purposes only and is not intended to limit the scope of the present disclosure. Rather, the location, size, shape, and coverage of the polyurethane layer 250 can vary significantly, depending upon the intended application of the textile composite, without departing from the scope of the present disclosure and any such variations are contemplated and considered to be within the scope of the present disclosure.

Embodiments of the present disclosure are thought to be useful in a wide range of different applications. Generally speaking, embodiments of a flexible and/or stretchable textile composite as described herein are thought to be adaptable to implementation where a color changing material may be desirable on articles of manufacture that have surfaces that curve, bend, fold, or are other than flat. For example, the article of manufacture can comprise a seat of a passenger vehicle and the covering comprises upholstery on the seat. In other cases, the article of manufacture can additionally, or alternatively, comprise a steering wheel of a passenger vehicle and the covering comprises a cover on the steering wheel. Additionally, or alternatively, the article of manufacture can comprise a dashboard of a passenger vehicle and the covering comprises upholstery on the dashboard. In yet other cases, the article of manufacture can additionally, or alternatively, comprise a control panel of a passenger vehicle and/or a control button of a passenger vehicle. A wide variety of other applications are contemplated and considered to be within the scope of the present disclosure.

Figure 8:
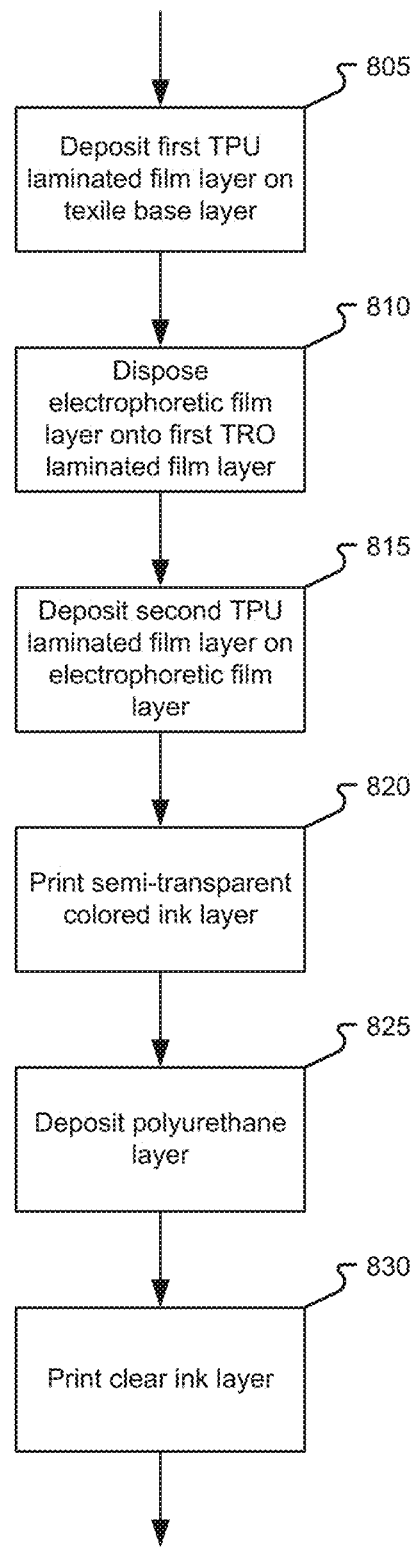
FIG. 8 is a flowchart illustrating a process for producing a flexible and stretchable textile composite including an electrophoretic film according to one embodiment of the present disclosure.

FIG. 8 is a flowchart illustrating a process for producing a flexible and stretchable textile composite including an electrophoretic film according to one embodiment of the present disclosure. As illustrated in this example, producing a textile composite material 200 as described above can begin with depositing 805 a first Thermoplastic PolyUrethane (TPU) laminated film layer 210 onto a textile base layer 205 and disposing 810 an electrophoretic film layer 215 onto the first TPU laminated film layer 210 on a side of the first TPU laminated layer 210 opposite the textile base layer 205. Prior to disposing 810 the electrophoretic film layer 215 onto the first TPU laminated layer 210 a plurality of relief cuts 220, 225, 230, and 235 can be made into the electrophoretic film layer 215. The geometry of the relief cuts allow for control of the bend in the x and y coordinates as well as the z coordinate with the film twisting slightly. This allows the composite to attain some stretch. Therefore, the plurality of relief cuts 220, 225, 230, and 235 can allow the electrophoretic film layer 215 to flex or stretch in at least one direction. The electrophoretic film layer 215 can comprise an electronic ink disposed between transparent ITO electrodes as described above and as known in the art using techniques and equipment as known in the art.

A second TPU laminated film layer 240 can be deposited 815 onto the electrophoretic film layer 215 on a side opposite of the electrophoretic film layer 215 opposite the first TPU laminated film layer 210. The first TPU laminated film layer 210 and the second TPU laminated film layer 240 can encapsulate the electrophoretic film layer 215. Depositing 805 of the first TPU laminated film layer 210 and depositing 815 of the second TPU laminated film layer can be done using techniques and equipment as known in the art.

A semi-transparent, colored ink layer 245 can be printed 820 onto the second TPU laminated film layer 240 on a side of the second TPU laminated film layer 240 opposite the electrophoretic film layer 215. The semi-transparent, colored ink layer 245 can comprise a color selected to enhance and/or change one or more colors of the underlying electrophoretic film layer 215.

A polyurethane layer 250 can be deposited 825 onto at least an edge of the first TPU laminated film layer 210, the electrophoretic film layer 215, and the second TPU laminated film layer 245 to form a protective seal and transition along and/or around the edge. The textile base layer 205 can extend beyond the polyurethane layer 250 to facilitate sewing of the textile composite 200. In some cases, the polyurethane layer 250 can be deposited across some or all of the surface of the semi-transparent, colored ink layer 245 thereby forming a solid, partial, or mesh covering over the semi-transparent colored ink layer 245. Depositing 825 the polyurethane layer 250 can be accomplished by techniques as known in the art.

One or more clear ink layers 255 can be printed 830 onto the polyurethane layer 250 on a side of the polyurethane layer 250 opposite the semi-transparent, colored ink layer 245 printed on the second TPU laminated film layer 240. The one or more clear ink layers 255 can provide a texture appearance and/or feel to the textile composite material 200. For example, the gloss or sheen of the one or more clear ink layers 255 and/or variations therein, the textile composite can be made to resemble various other materials such as wood grain, leather, metal, etc. Similarly, multiple clear ink layers are printed/deposited on top of each other to increase depth/height of the texture. Through such patterns of variations in the thickness of the one or more clear ink layers 255 applied during printing 830, the textile composite can be given a tactile feel resembling other materials.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An article of manufacture comprising:
a covering on at least a portion of a surface of the article of manufacture, the covering comprising a textile composite material that comprises:
a textile base layer;
a first flexible, optically transparent film layer deposited onto and affixed to the textile base layer;
an electrophoretic film layer printed onto the first flexible, optically transparent film layer on a side of the first flexible, optically transparent layer opposite the textile base layer, wherein the electrophoretic film layer comprises an electronic ink disposed between transparent Indium Tin Oxide (ITO) electrodes and further comprises a plurality of relief cuts therein, the plurality of relief cuts allowing the electrophoretic film layer to flex or stretch in at least one direction;
a second flexible, optically transparent film layer deposited onto the electrophoretic film layer on a side of the electrophoretic film layer opposite the first flexible, optically transparent film layer, wherein the first flexible, optically transparent film layer and the second flexible, optically transparent film layer encapsulate the electrophoretic film layer;

a semi-transparent, colored ink layer printed onto the second flexible, optically transparent film layer on a side of the second flexible, optically transparent film layer opposite the electrophoretic film layer;

a polyurethane layer deposited on and affixed to a surface of the semi-transparent, colored ink layer printed on the second flexible, optically transparent film layer; and one or more clear ink layers printed onto the polyurethane layer on a side of the polyurethane layer opposite the semi-transparent, colored ink layer printed on the second flexible, optically transparent film layer, wherein the one or more clear ink layers provides a texture appearance or feel to the textile composite material.

2. The article of manufacture of claim 1, wherein the article of manufacture comprises a seat of a passenger vehicle and the covering comprises upholstery on the seat.

3. The article of manufacture of claim 1, wherein the article of manufacture comprises a steering wheel of a passenger vehicle and the covering comprises a cover on the steering wheel.

4. The article of manufacture of claim 1, wherein the article of manufacture comprises a dashboard of a passenger vehicle and the covering comprises upholstery on the dashboard.

5. The article of manufacture of claim 1, wherein the article of manufacture comprises a control panel of a passenger vehicle.

6. The article of manufacture of claim 1, wherein the article of manufacture comprises a control button of a passenger vehicle.

* * * * *